(12) United States Patent
Soderberg

(10) Patent No.: US 9,273,924 B2
(45) Date of Patent: Mar. 1, 2016

(54) BOWFISHING REEL SEAT

(71) Applicant: Eric Christian Soderberg, Milaca, MN (US)

(72) Inventor: Eric Christian Soderberg, Milaca, MN (US)

( * ) Notice: Subject to any disclaimer, the term of this patent is extended or adjusted under 35 U.S.C. 154(b) by 0 days.

(21) Appl. No.: 14/141,074

(22) Filed: Dec. 26, 2013

(65) Prior Publication Data

US 2015/0053195 A1 Feb. 26, 2015

Related U.S. Application Data

(63) Continuation-in-part of application No. 13/065,596, filed on Mar. 24, 2011, now Pat. No. 8,635,802.

(60) Provisional application No. 61/341,703, filed on Apr. 2, 2010.

(51) Int. Cl.
*A01K 81/00* (2006.01)
*F41B 5/14* (2006.01)
*A01K 91/02* (2006.01)
*F42B 12/16* (2006.01)
*F42B 14/06* (2006.01)

(52) U.S. Cl.
CPC ............... *F41B 5/1488* (2013.01); *A01K 91/02* (2013.01); *F41B 5/14* (2013.01); *F41B 5/1403* (2013.01); *F42B 12/16* (2013.01); *F42B 14/06* (2013.01); *F42B 14/064* (2013.01); *Y10T 29/49963* (2015.01)

(58) Field of Classification Search
CPC ........ F41B 5/14; F41B 5/1488; F41B 5/1403; F42B 14/06; F42B 14/064; F42B 12/16; A01K 91/02; Y10T 29/49963
See application file for complete search history.

(56) References Cited

U.S. PATENT DOCUMENTS

| 1,980,317 | A | * | 11/1934 | Clark | A01K 87/06 43/22 |
| 2,817,919 | A | | 12/1957 | Cress | |
| 3,197,908 | A | * | 8/1965 | Hirsch | A01K 87/06 43/22 |
| 3,589,350 | A | | 6/1971 | Hoyt, Jr. | |
| 4,467,548 | A | * | 8/1984 | Tabor | 43/23 |
| 4,738,046 | A | * | 4/1988 | Fraylick et al. | 43/18.1 R |
| 4,891,899 | A | * | 1/1990 | Wulff | A01K 87/06 43/22 |
| 8,534,273 | B2 | * | 9/2013 | LoRocco et al. | 124/89 |
| 8,635,802 | B2 | * | 1/2014 | Soderberg | F41B 5/14 124/88 |
| 2006/0230669 | A1 | * | 10/2006 | Markley et al. | 43/23 |

* cited by examiner

*Primary Examiner* — Jeanette E Chapman

(57) ABSTRACT

A reel seat for attaching a reel foot of a reel to a bow includes a shaft, a rear bushing, a cap, a first threaded fastener, and a second threaded fastener. The shaft has a first end and a second end, an outer surface, a first bore formed into the first end of the shaft, and a second bore formed into the second end of the shaft. The rear bushing includes a limiter portion and a receiver portion, the limiter portion being secured to the shaft and defining an increased diameter relative to the shaft to form a stop surface the receiver portion having a bore and being coaxially received over the shaft such that the receiver portion is abutted against the stop surface and rotatable about the shaft.

17 Claims, 16 Drawing Sheets

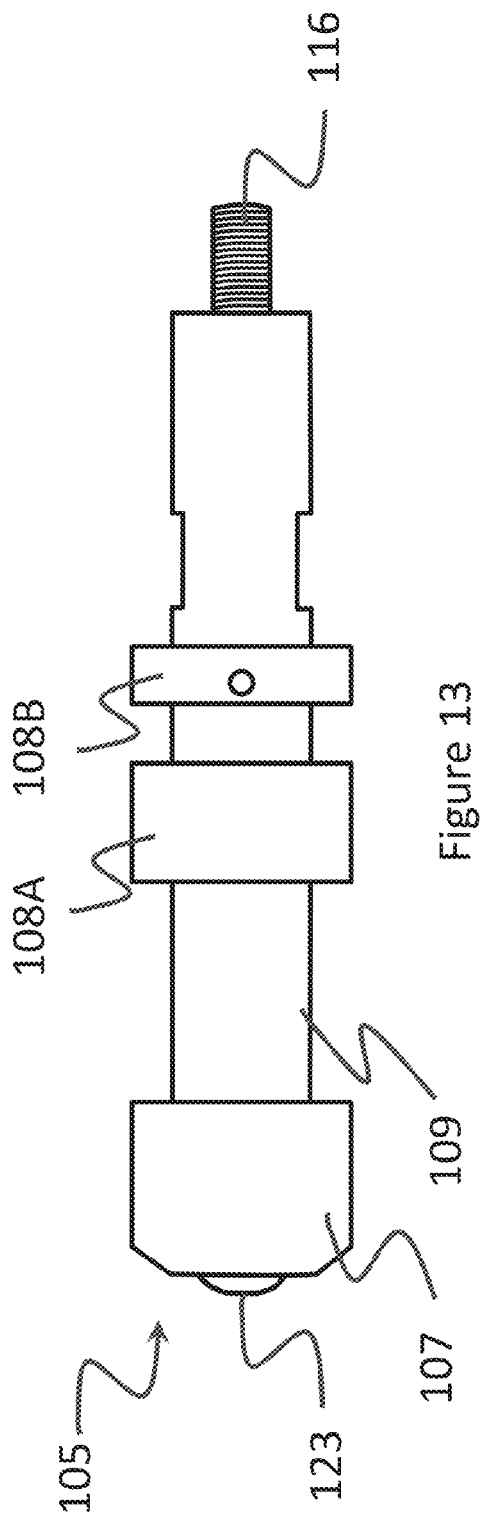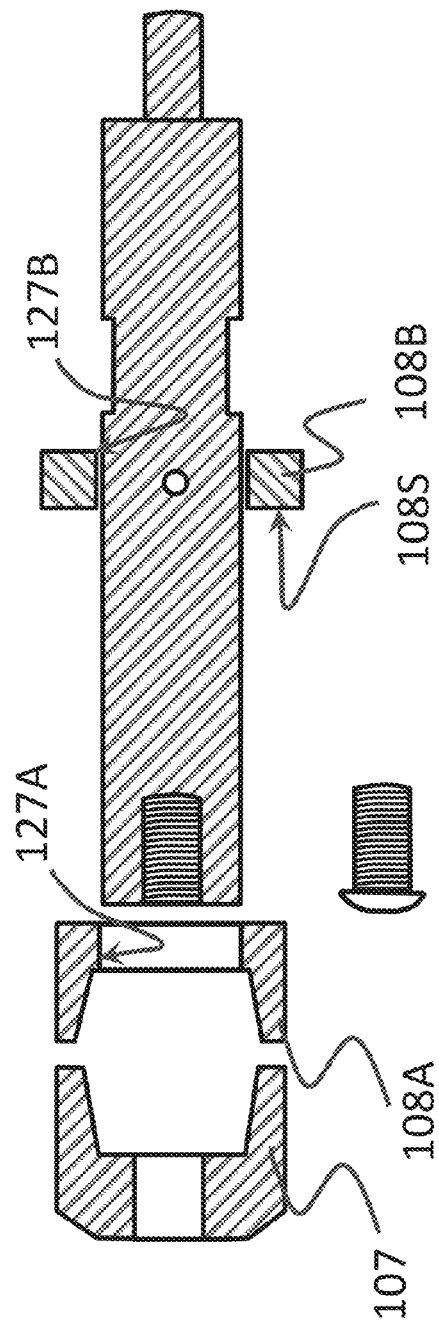
Figure 13
Figure 14

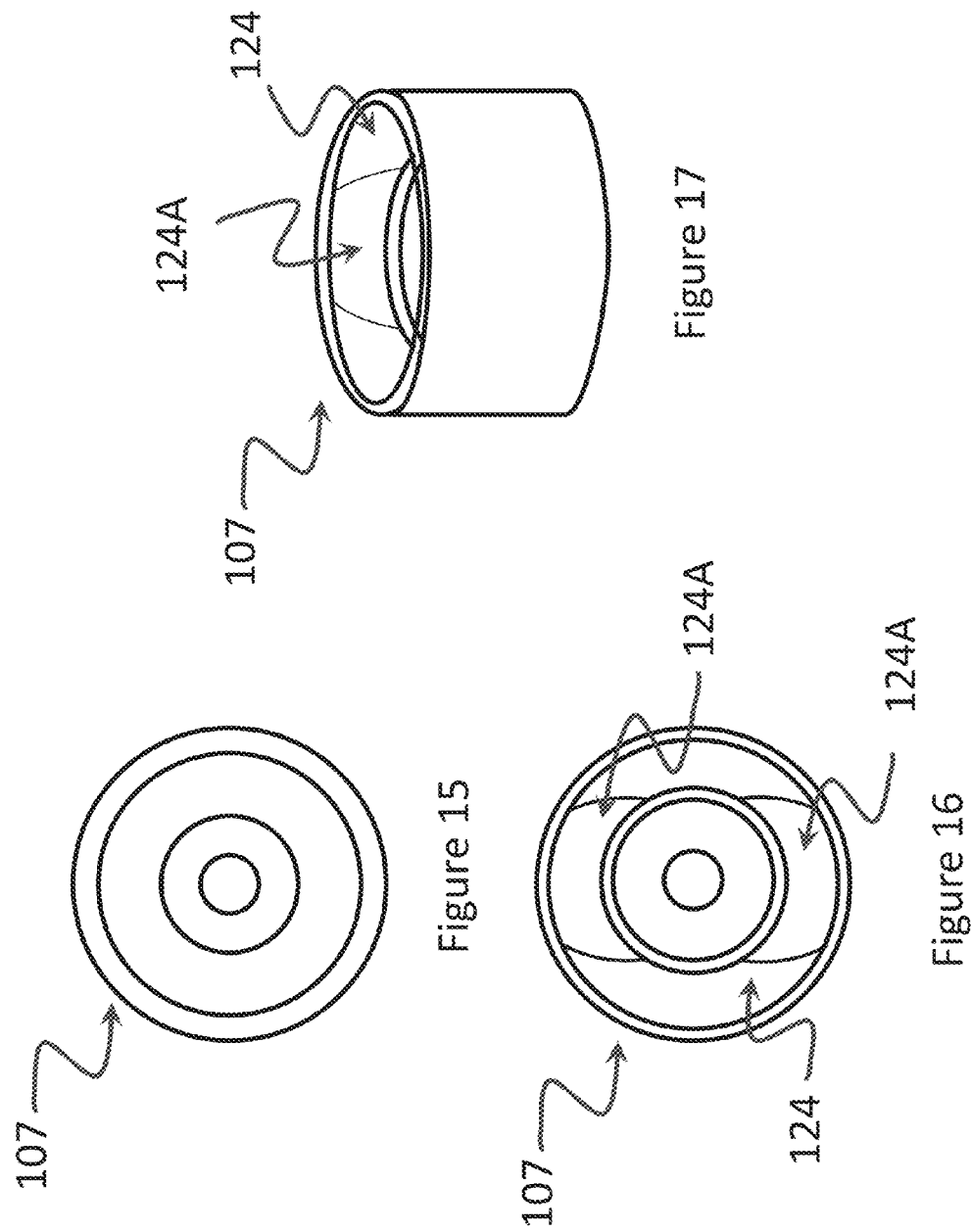

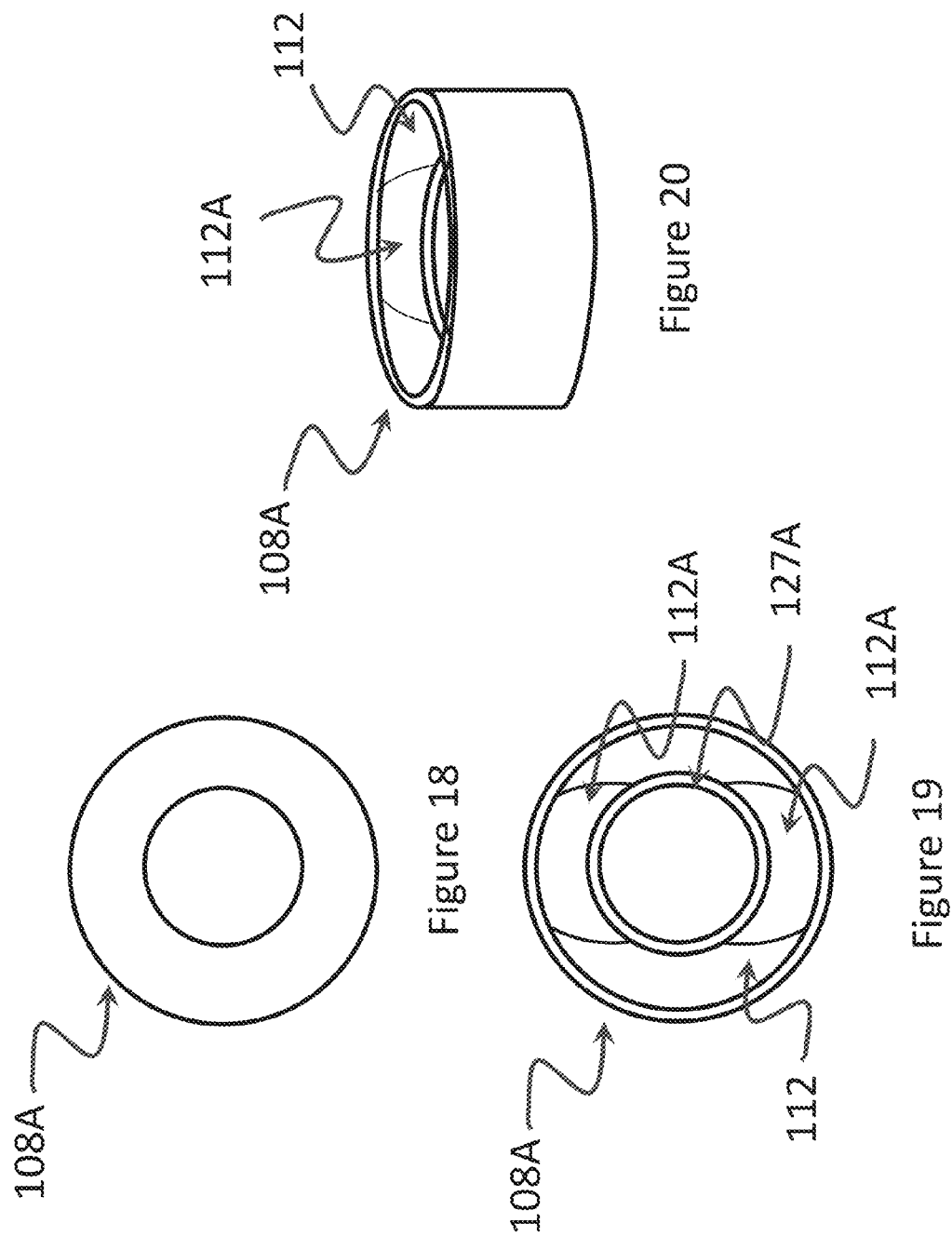

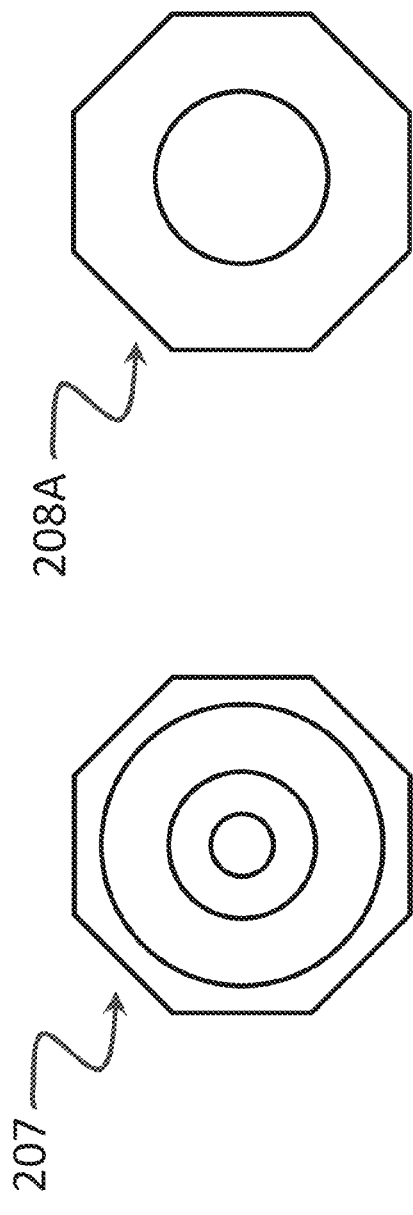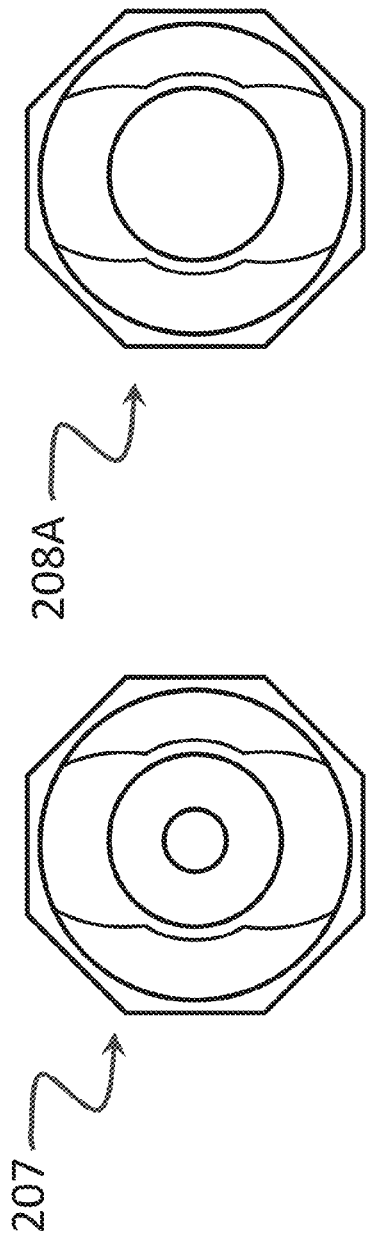

BOWFISHING REEL SEAT

CROSS-REFERENCE TO RELATED APPLICATION

This application is a Continuation-in-Part to application Ser. No. 13/065,596, filed Mar. 24, 2011, titled "BOWFISHING REEL SEAT", which claims priority from Provisional Patent Application No. 61/341,703, filed Apr. 2, 2010, titled "BOWFISHING REEL SEAT" which is incorporated herein by reference in its entirety.

BACKGROUND

This disclosure relates generally to archery and more specifically to bowfishing reel seats that are employed when harvesting fish with a bow and arrow.

Bowfishing is the taking of fish by means of a bow and arrow. This ancient hunting technique is presently a popular and growing sport, a novel way to put food on the table, and a tool to aid in the reduction of unwanted or invasive fish species. State of the art bowfishing reel seats are derived from a variety of previous devices. U.S. Pat. No. 1,980,317, (Clark et al.), discloses a fishing reel secured with a movable sleeve. While suitable for use on a fishing rod, the Clark et al. device is unsuitable for bowfishing applications. The movable sleeve of Clark et al. is constrained to a fixed longitudinal axis and is only capable of sliding along the shaft and not rotatably about the shaft itself. The Clark et al. sleeve is threaded and requires a mating coupler, thereby increasing the cost and weight of the device.

U.S. Pat. No. 3,197,908 (Hirsch), discloses a reel seat fastening scheme while U.S. Pat. No. 3,589,350 (Hoyt) discloses an attachment mechanism for use with an archery bow. These devices require the use of locking rings which can result in unwanted movement of the reel and which cannot be sufficiently tightened without causing damage to one or more parts of the reel seat. A further disadvantage is the use of jamb nuts which can easily loosen. The jamb nuts create a weakened region and also increase the overall length of the reel seat.

SUMMARY

Various inventive aspects disclosed herein are intended to address some of the deficiencies of current bowfishing reel seats. In some embodiments, the reel seats described herein are removable and may be readily remounted at any position around the axial periphery of a cylindrical shaft. The cylindrical shaft optionally includes internally threaded bores at each end with one end having machined flats to aid in fastening a protruding threaded fastener. A cylindrical bored bushing with an internal tapered portion may be fastened adjacent to the machined flats with the larger internal tapered opening facing away from the flats. A portion of the cylindrical shaft extends beyond the bushing At one end of the cylindrical shaft a cap is slidably attached. The cap optionally has both a terminating bore which mates with the cylindrical shaft as well as an internal taper which extends away from the terminating bore. The cap also optionally has a smaller axial bore through which a fastener may pass and mate with the corresponding thread of the cylindrical shaft. An additional feature may be an extended cap which can be used instead of the aforementioned cap. The extended cap provides a region to wrap or store bowfishing line.

Some embodiments relate to a reel seat for attaching a reel foot of a reel to a bow, the reel seat including a shaft, a rear bushing, a cap, a first threaded fastener, and a second threaded fastener. The shaft has a first end and a second end, an outer surface, a first bore formed into the first end of the shaft, and a second bore formed into the second end of the shaft. The rear bushing includes a limiter portion and a receiver portion, the limiter portion being secured to the shaft and defining an increased diameter relative to the shaft to form a stop surface the receiver portion having a bore and being coaxially received over the shaft such that the receiver portion is abutted against the stop surface and rotatable about the shaft, the receiver portion defining an internal surface configured to receive a first end of a reel foot between the receiver portion and the shaft. The cap defines a first end with an aperture and a second end, the cap having a bore extending from the second end toward the first end and defining an internal surface configured to receive a second end of a reel foot between the shaft and the cap. The first threaded fastener secures the cap to the shaft, the fastener extending through the aperture in the first end of the cap and into the first bore formed in the first end of the shaft to secure the cap to the shaft. The second threaded fastener is for securing the reel seat to a bow, the second threaded fastener secured in the second bore formed in the second end of the shaft.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 13 and 14 are plan and longitudinal section views of another reel seat;

FIGS. 15, 16, and 17 are front, rear, and isometric views, respectively, of a cap of the reel seat of FIGS. 13 and 14; and FIGS. 18, 19, and 20 are front, rear, and isometric views, respectively, of a receiver portion of the reel seat of FIGS. 13 and 14.

FIGS. 21 and 22 are front and rear views, respectively, of another cap of a reel seat.

FIGS. 23 and 24 are front and rear views, respectively, of another receiver portion of a reel seat.

DETAILED DESCRIPTION

Figure 1:
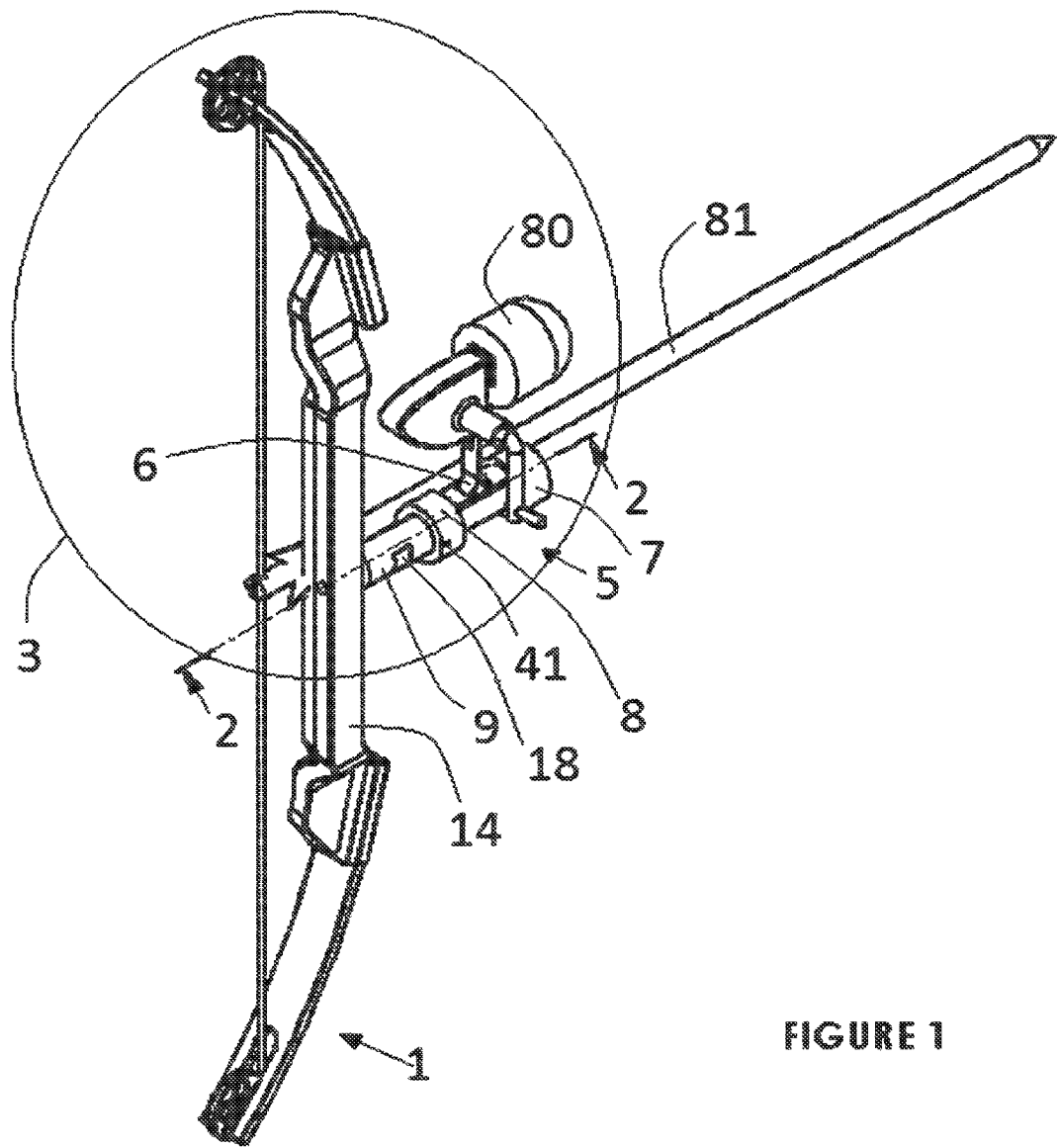
FIG. 1 is a perspective view of the present invention shown with a fishing reel attached and mounted to an archery bow.

Referring to FIG. 1, a riser 14 of an archery bow 1 is shown. Attached to the riser 14 is a bowfishing reel seat 5 constructed according to the principles of the present invention. A fishing reel 80 is mounted on the reel seat 5. The reel 80 contains bowfishing line which is attached to the arrow 81 by means which are well known in the bowfishing field.

Figure 2:
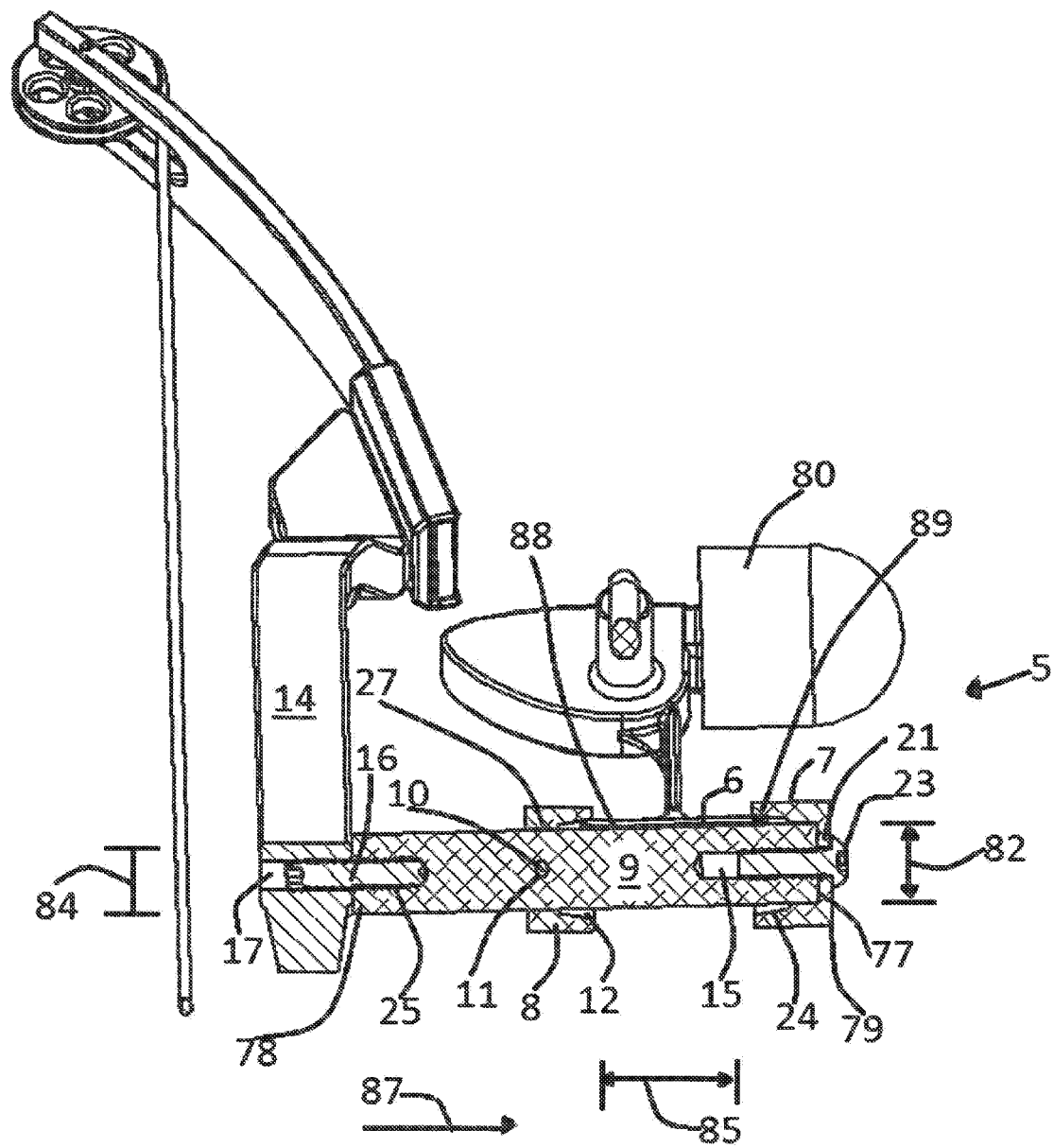
FIG. 2 is a sectional view taken along lines 2-2 within the region 3, with some elements omitted for clarity, as depicted in FIG. 1.

Referring to FIG. 2, the reel seat 5 is seen to include a longitudinal supporting shaft 9, having a diameter 82 of approximately 0.875 inches. The shaft has a first end 77 and a second end 78. The reel seat 5 includes opposing axially bored and threaded terminating holes or bores, the bore 15 being formed in the first end 77 and the bore 25 being formed in the second end 78. The bore 15 accepts a cooperating threaded fastener 23 and bore 25 accepts a threaded stud 16. A standardized 5/16"×24NF threaded stabilizer bore 17 already present in the bow riser 14 accepts the cooperating threaded fastener 16, which may be fastened to the axially threaded hole 25 of the reel seat 5. Inserting the fastener 16 into the threaded bore 25 permits protrusion of a portion of the threaded fastener 16 beyond the shaft 9, thereby permitting fastener 16 to be screwed into the threaded stabilizer bore 17 of the bow riser 14. The fastener 16 thereby supports shaft 9 of the reel seat 5 and causes reel seat 5 to contact and substantially bear upon the riser body 14. The opposing flat surfaces 18 seen in FIG. 1 that are formed within the surface of shaft 9 provide a means to rotate the shaft 9 by cooperating mechanical means such as a wrench so as to substantially increase or decrease the contact area and subsequent friction between the shaft 9 and the riser body 14.

Forward of the flat surfaces 18 may be fastened or secured the rear bushing 8 which is slideable upon the supporting shaft 9, the diameter 84 of the bushing 8 being approximately 0.001 to 0.004 inches greater than the diameter 82 of shaft 9. Forward of the rear bushing 8 is the cap 7 which is fastened to the supporting shaft 9 by threaded fastener 23 which passes through the axial borehole 21 formed in the top region 79 of the cap 7. The axial threaded bore 15 of the supporting shaft 9 accepts the cooperating threaded fastener 23 to secure cap 7. The reel foot 6, being part of the reel 80, is captured by the rear bushing 8 and the cap 7 and rests upon the supporting shaft 9. By screwing threaded fastener 23 through cap 7 and into the threaded bore 15, the reel foot 6 is pushed further into the secured rear bushing 8 and the correspondingly shaped internal radial taper 12 of approximately nine degrees. The cap 7 is formed to include a correspondingly shaped internal surface 24 also having a nine degree taper. The cap 7 and the rear bushing 8 have substantially identical internal shapes and dimensions. The compression force created on the cap 7 by fastener 23 within the threaded bore 15 secures the reel foot 6 between the cap 7 and the rear bushing 8.

Figure 3:
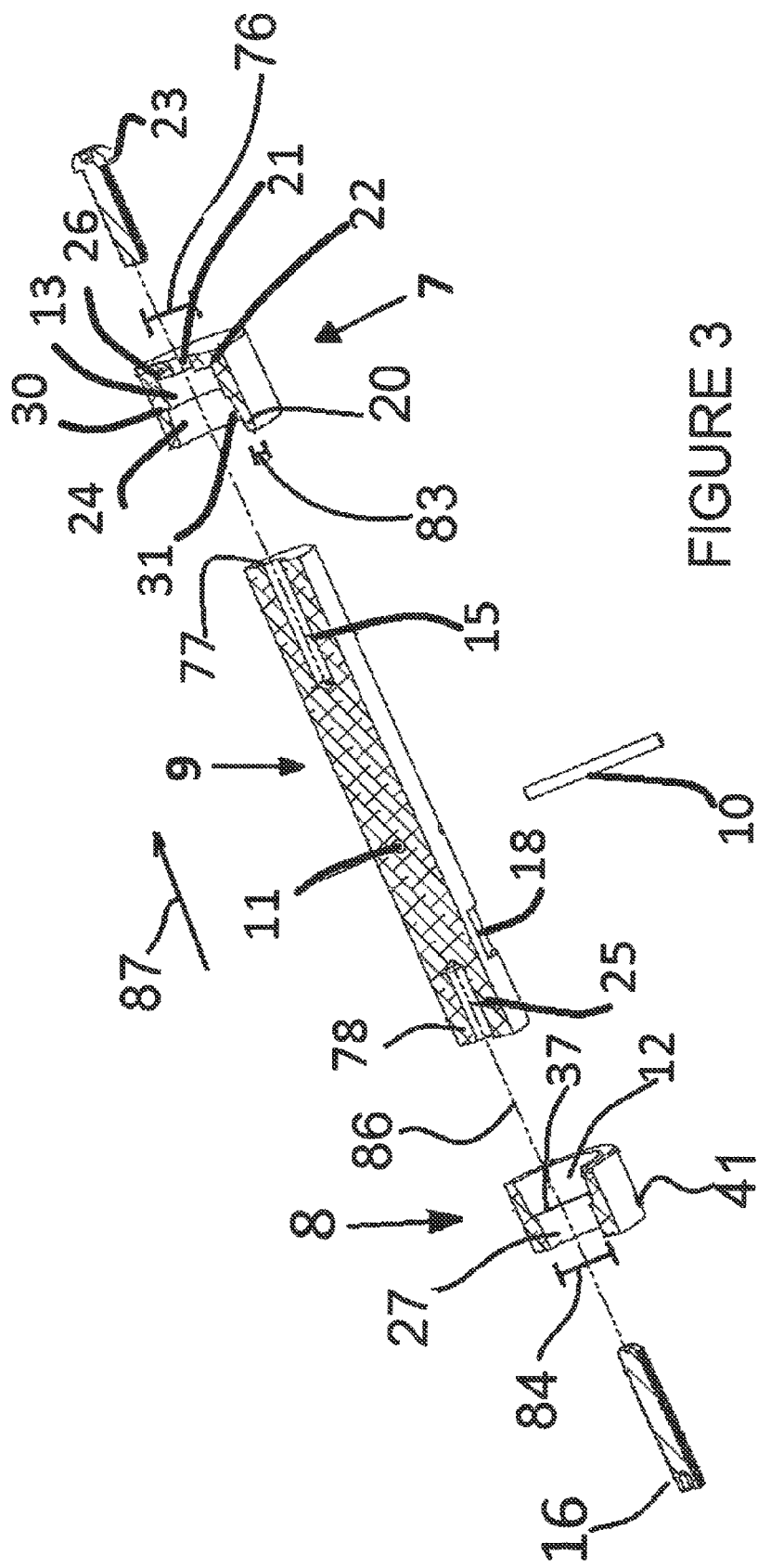
FIG. 3 is an exploded cross-sectional view of the invention as illustrated in FIG. 2.
Figure 4:
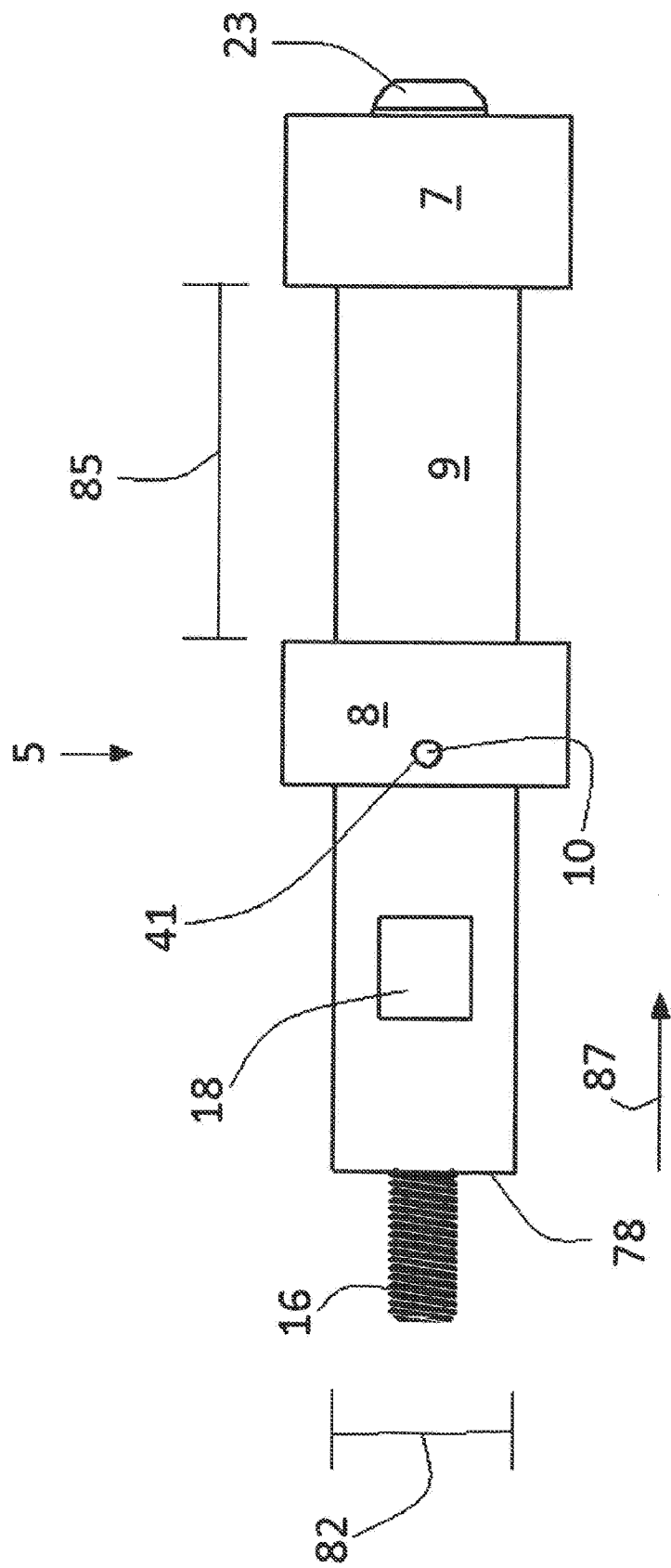
FIG. 4 is a side elevation of the invention of as illustrated in FIG. 1.

Referring also to FIG. 3, the tapering internal surface 24 originates at lower circumferential wall 20 where the wall thickness 83 is approximately 0.136 inches and continues approximately 0.350 inches until terminating at shoulder 30. The axial bore 13 of the cap 7 has a diameter 76, the axial bore 13 terminating at corner 22 a distance of approximately 0.320 inches from shoulder 30 so as to accept and retain a portion of the supporting shaft 9. At the terminal end 22 of said cap 7 is a diametrically smaller axial bore 21 through which a threaded fastener 23 may be inserted. The thickness of wall 26 surrounding the axial bore 21 is approximately 0.150 inches. The fastener 23 screws into the threaded axial bore 15 of the supporting shaft 9. A gap or space 85 is provided between the cap 7 and the rear bushing 8 along the longitudinal axis 86 of the supporting shaft 9. In the preferred embodiment, the rear bushing 8 is slideable along the supporting shaft 9 through an axial bore 27 having a diameter 84 that is slightly greater than the diameter 82 of the supporting shaft 9. The rear bushing preferentially has an internal tapered wall 12 terminating adjacent to shoulder 37 of the axial bore 27. A cross hole 41 bisects the rear bushing 8. The supporting shaft 9 is bisected by at least one similarly sized cross hole 11. A fastener pin 10 extends through the cross hole 41 and one of the available cross holes 11 that have been formed through the shaft 9.

Figure 9:
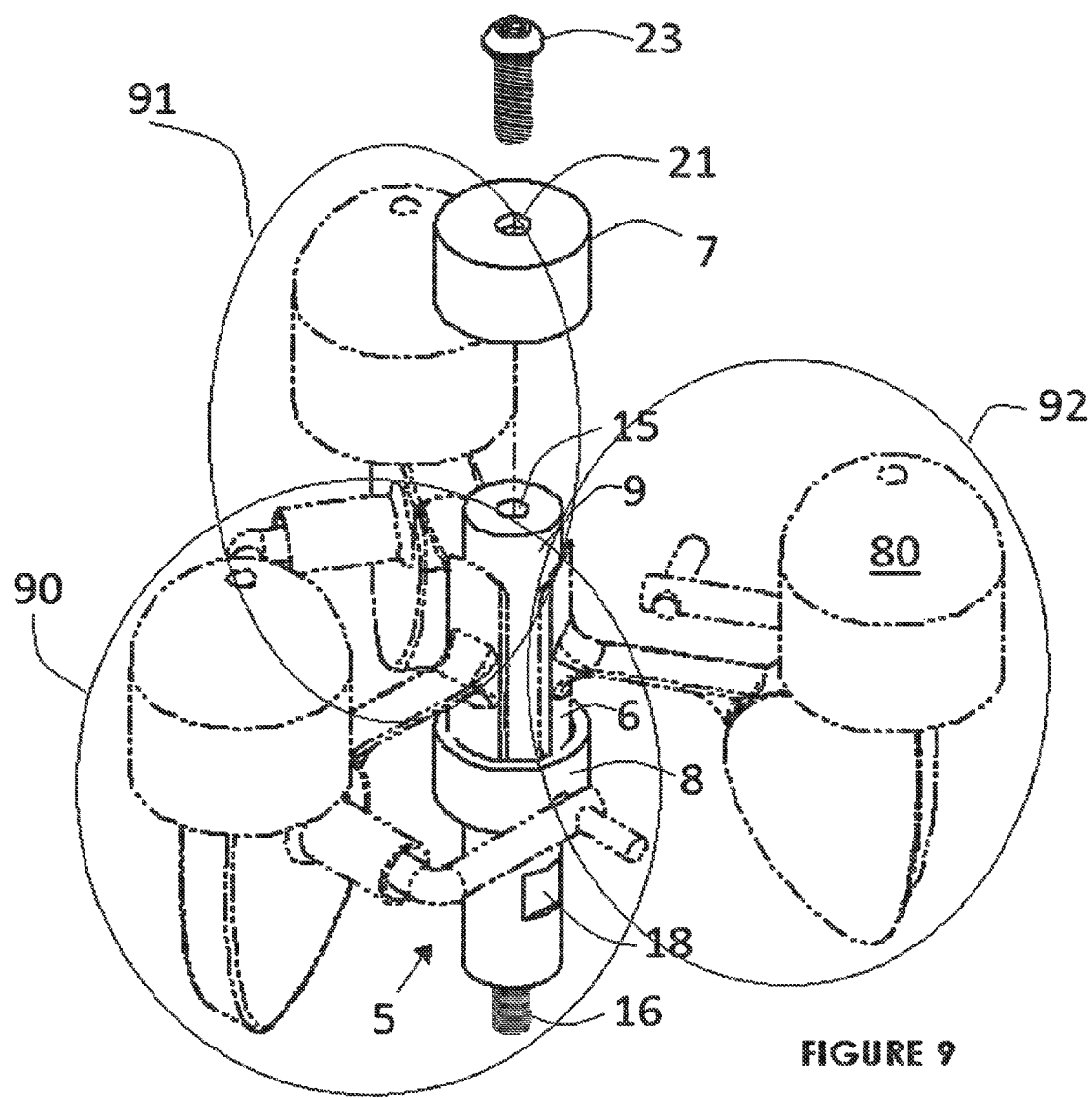
FIG. 9 is an isometric view of the present invention during assembly with alternate positions of a reel shown in phantom.
Figure 10:
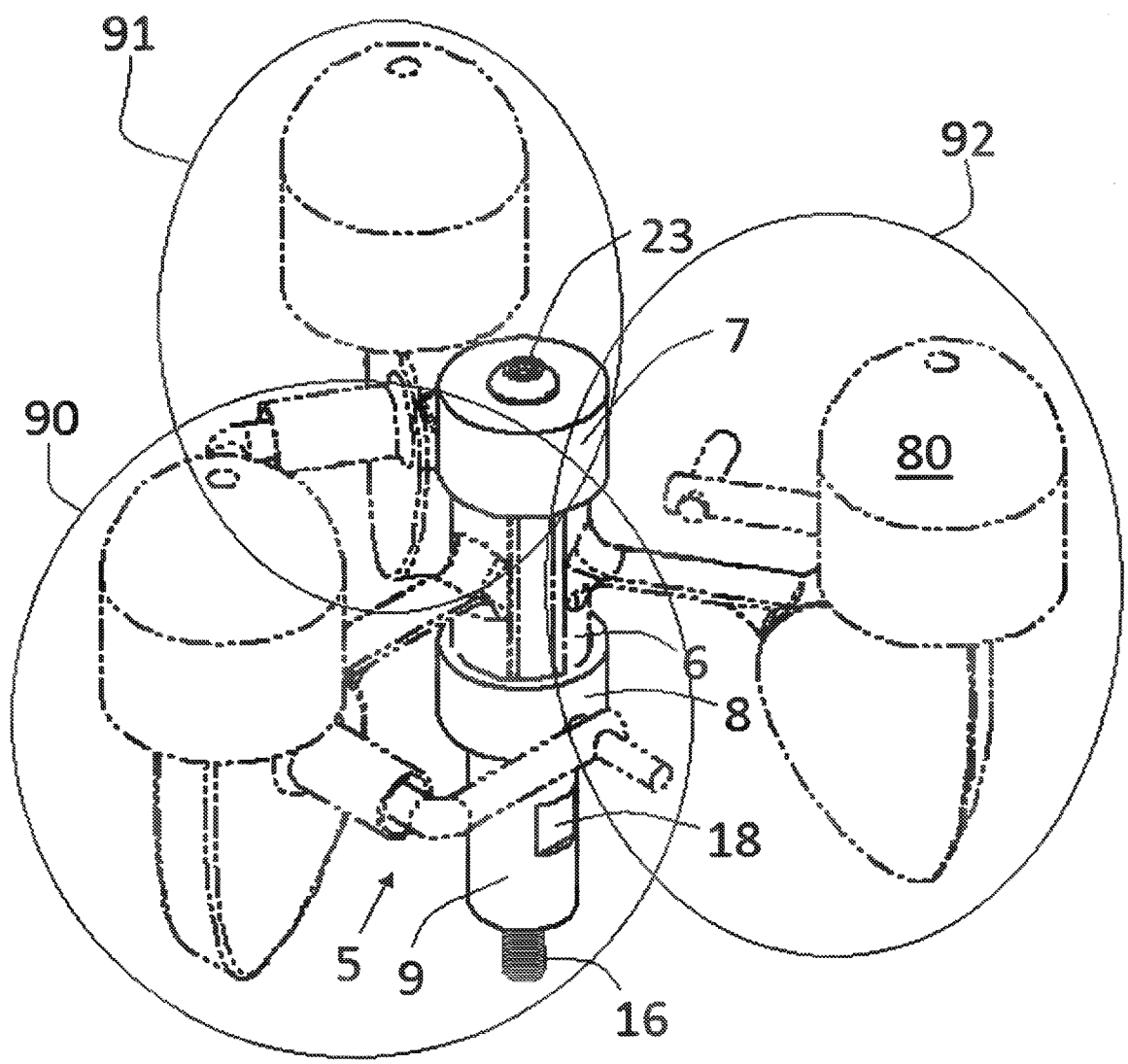
FIG. 10 is an isometric view of the present invention after assembly of components depicted in FIG. 9 is completed.
Figure 11:
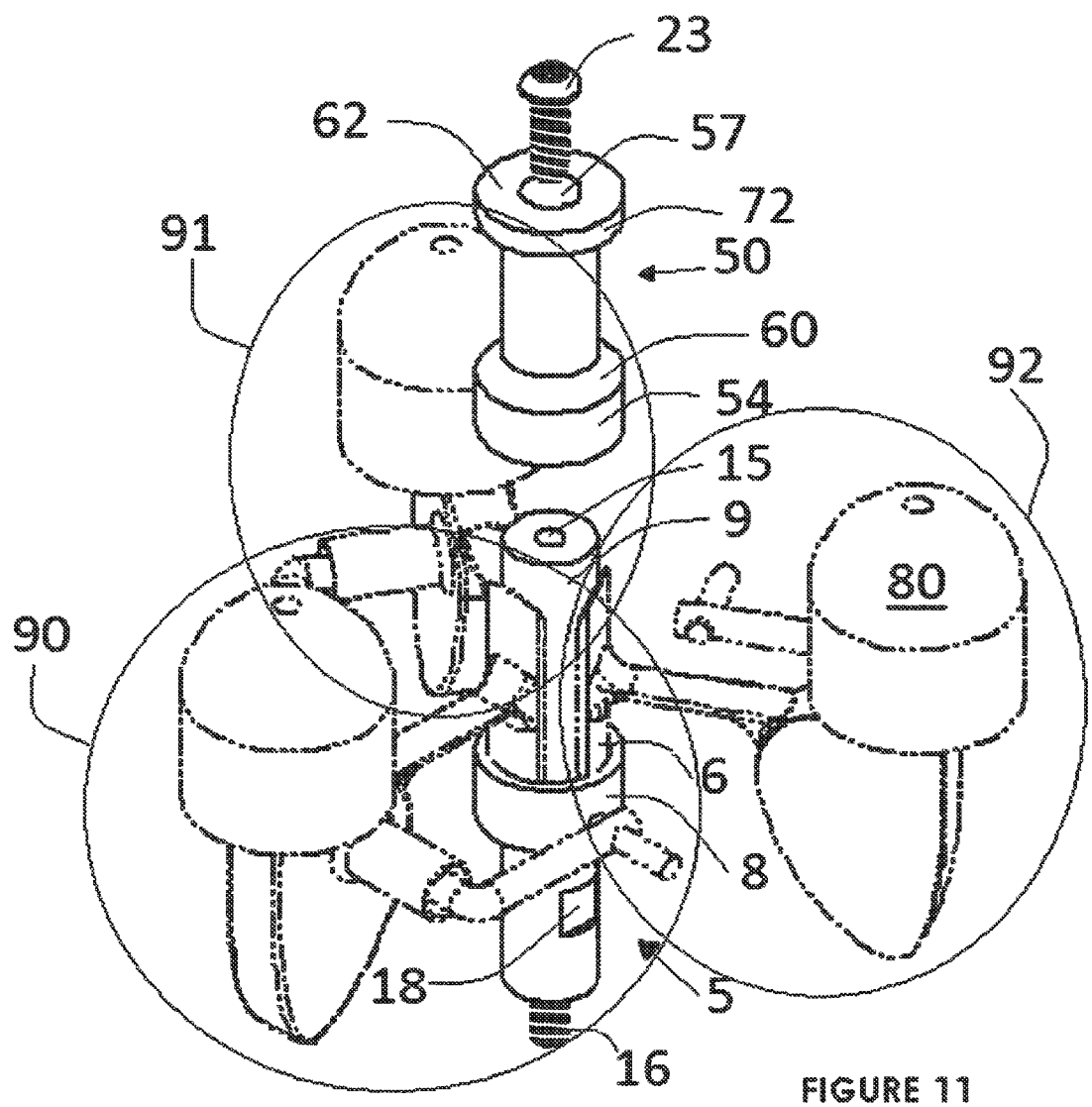
FIG. 11 is an isometric view of the extended accessory cap depicted in FIG. 5 as seen during assembly with alternate positions of a reel shown in phantom.
Figure 12:
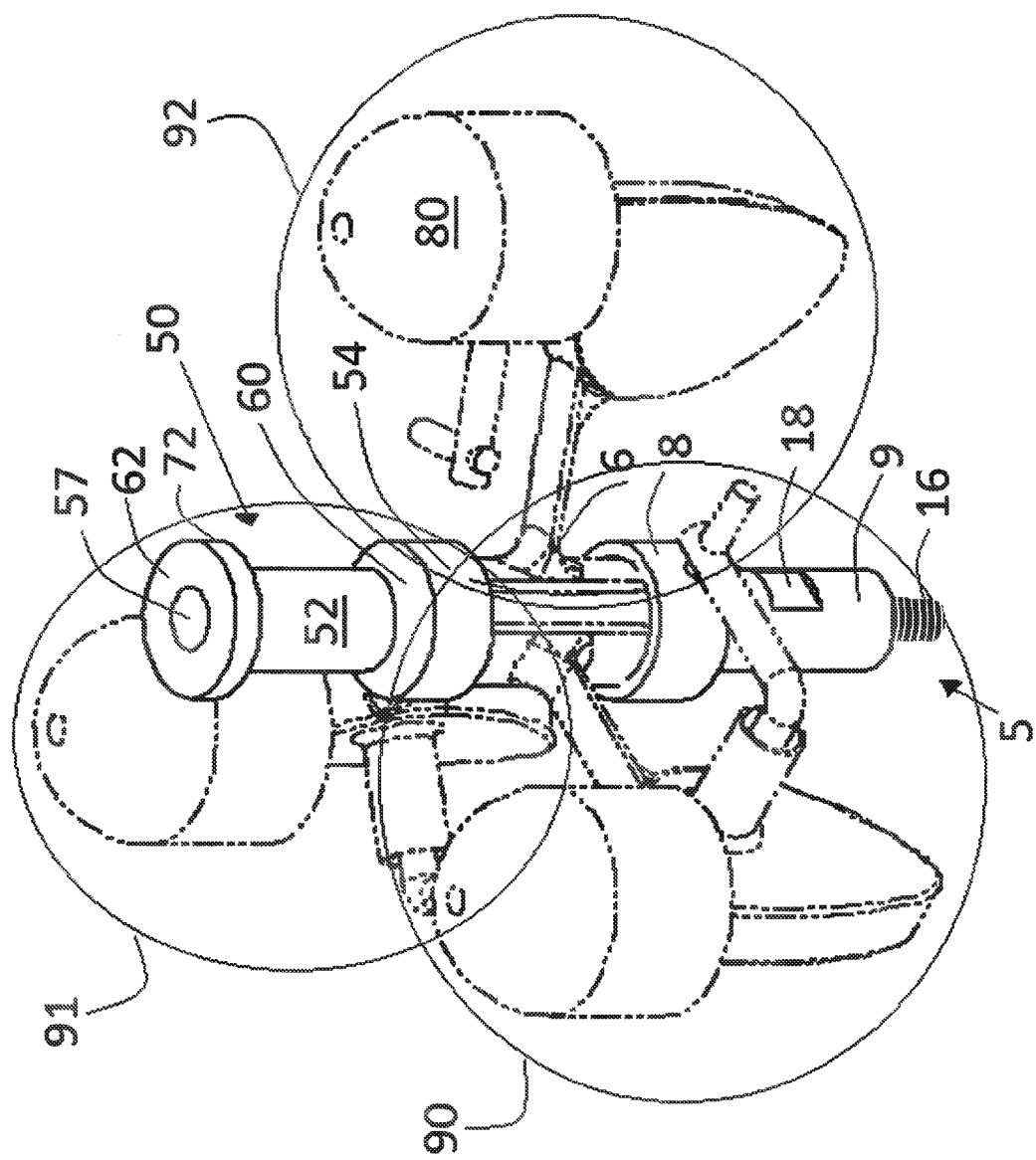
FIG. 12 is an isometric view of accessory extended cap after assembly of components depicted in FIG. 11 is completed.

In use, the shaft 9 is typically grasped with one hand, and the riser 14 of the bow 1 is grasped with the other hand. The threaded fastener 16 is screwed into the cooperating threaded stabilizer hole 17 of bow riser 14 and tightened by hand. A wrench is then applied to the flat surfaces 18 of the supporting shaft 9 for final tightening The threaded fastener 23 is then sufficiently loosened to allow the cap 7 to slide along the supporting shaft 9 in the direction of arrow 87 and away from stationary rear bushing 8. A first region 89 of the reel foot 6 is then inserted into the tapered portion 24 of the cap 7. The reel foot 6 is then able to rest upon the supporting shaft 9 and a second region 88 of the reel foot 6 can slide into the tapered portion 12 of the stationary rear bushing 8. After sliding cap 7 back into contact with the first portion 89 of the reel foot 6, the threaded fastener 23 may be lightly tightened and reel 3 may be rotated into a desired position, such as positions 90, 91 and 92 as illustrated, for example, as shown in FIG. 9, or any circumferential position on the supporting shaft 9. The fastener 23 is then tightened sufficiently to prevent movement of the reel 80.

Figure 5:
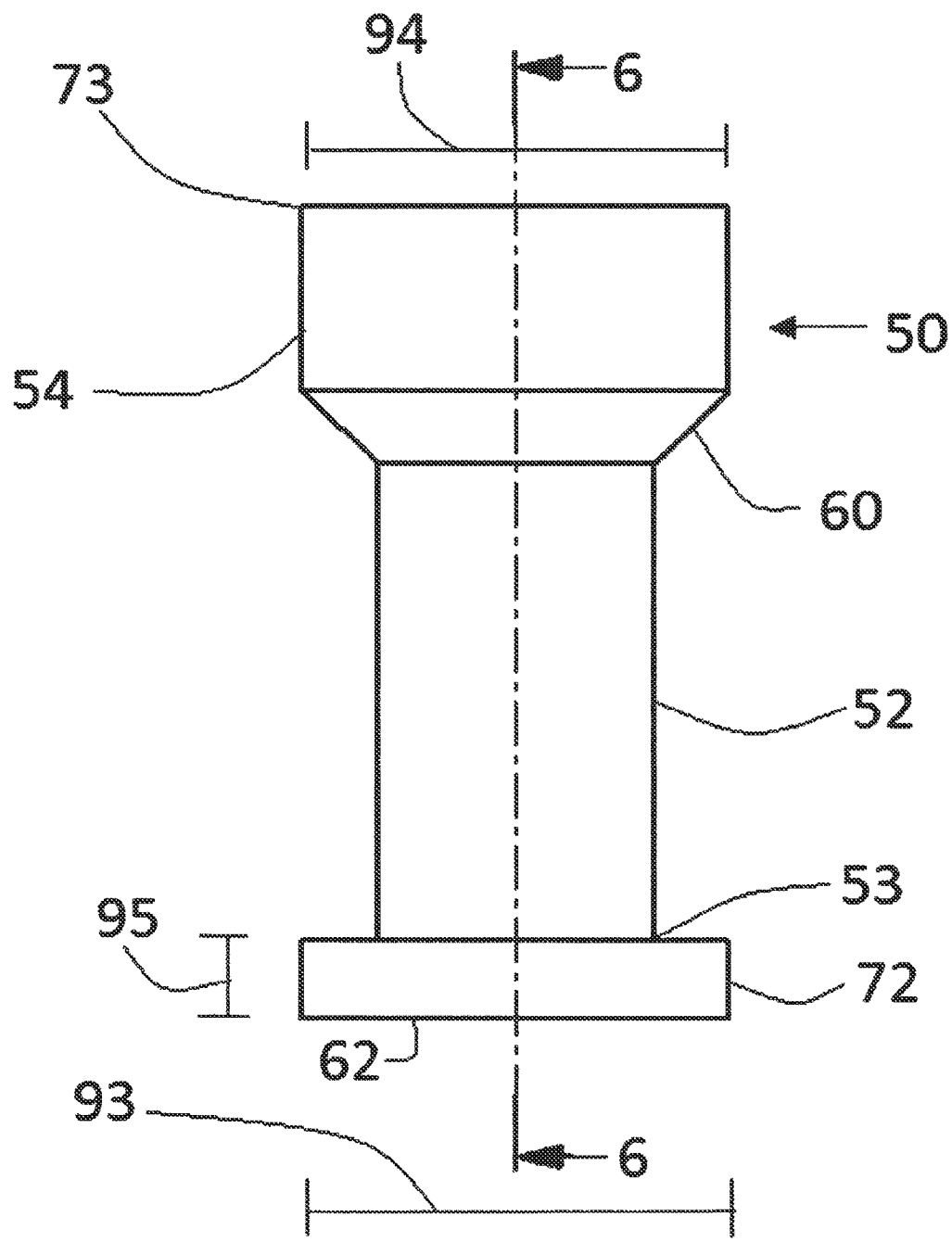
FIG. 5 is a side elevation of an accessory extended cap that may be used in conjunction with the invention depicted in FIG. 1.

FIG. 5 depicts an accessory extended cap 50 having a proximal end 73 and distal end 62, "proximal" and "distal" referring to their relationship to a user of the cap 50. The cap 50 includes an annular flange 72 having a diameter 93. The height 95 of flange 72 is approximately 0.250 inches. The flange 72 is integrally formed with a diametrically smaller cylindrical column 52 which abuts a tapered region 60. Abutting the tapered region 60 is an annular section 54 having a diameter 94 that is substantially equal to diameter 93.

Figure 6:
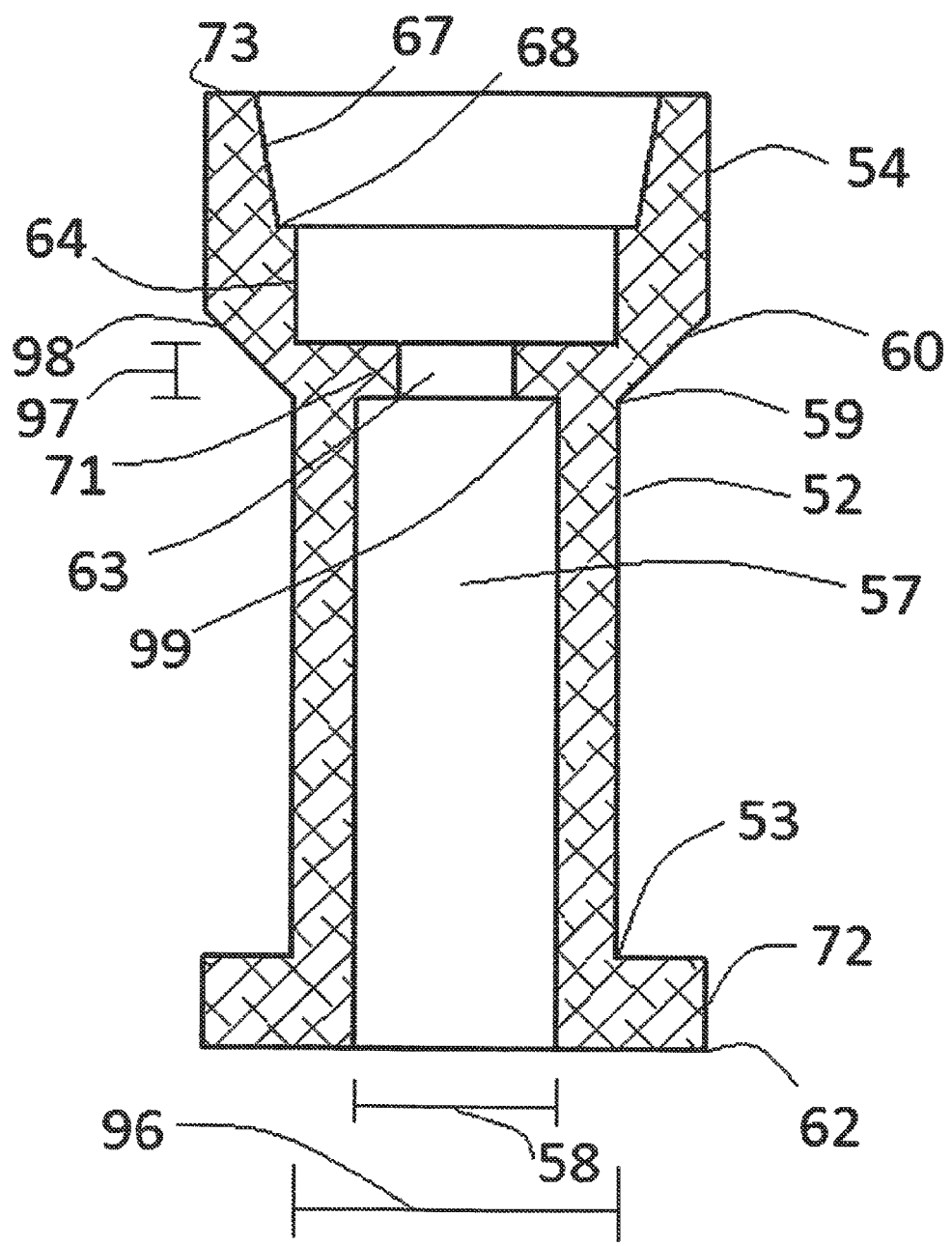
FIG. 6 is a cross-section of the accessory extended cap taken along line 6-6 as shown in FIG. 5.
Figure 7:
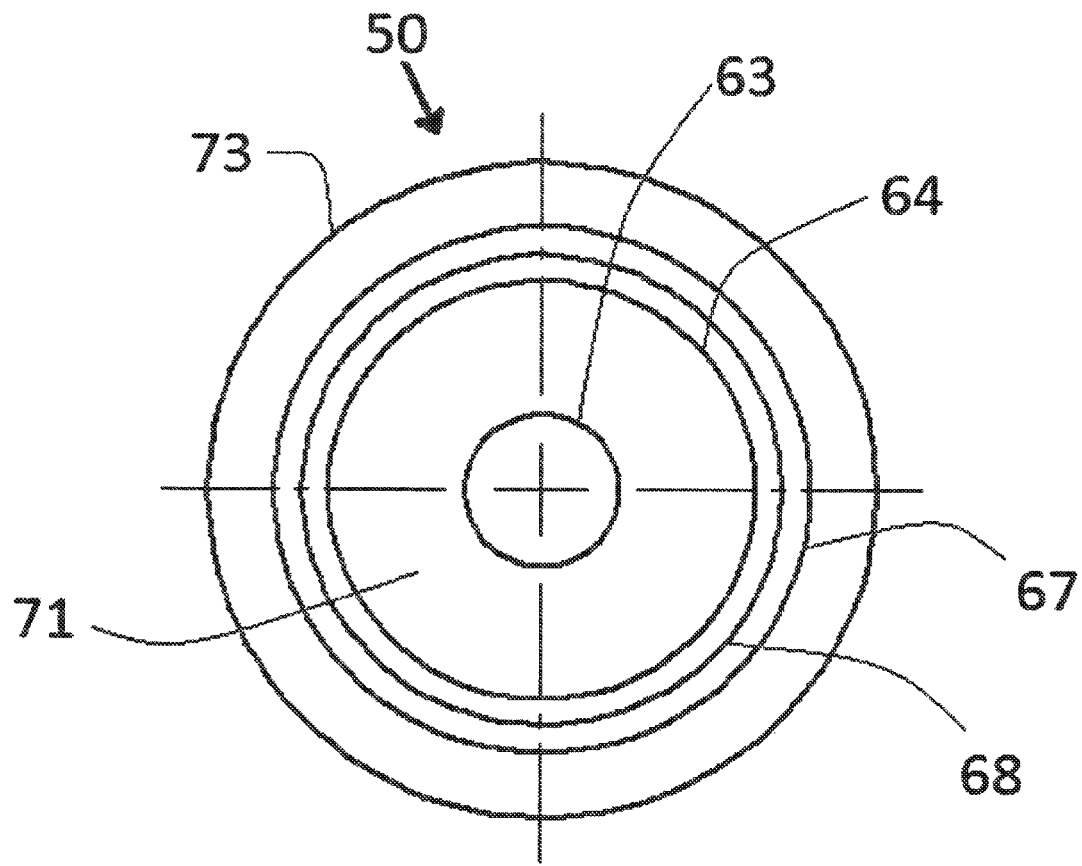
FIG. 7 is a top plan view of the accessory extended cap shown in FIG. 5.
Figure 8:
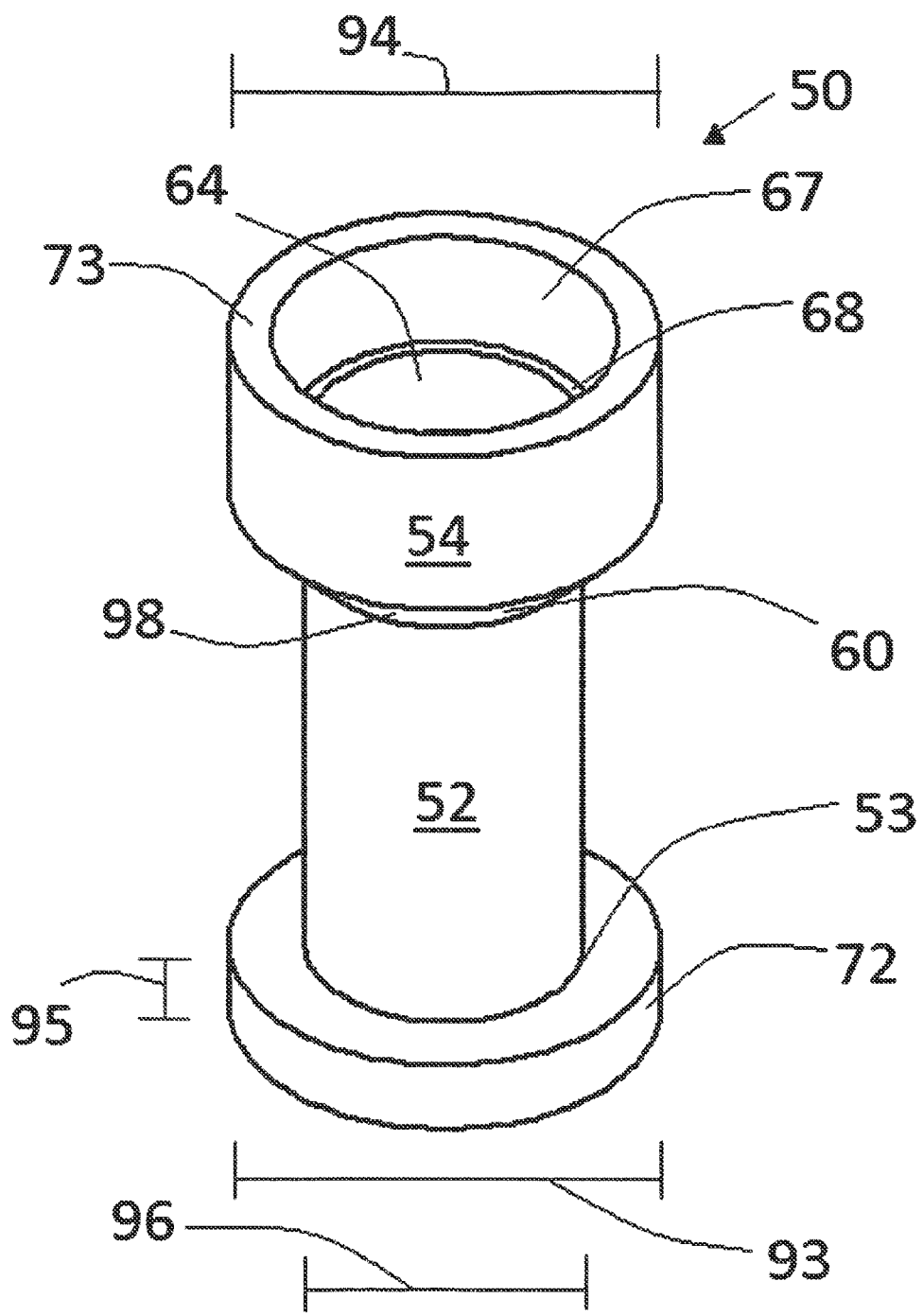
FIG. 8 is an isometric view of the accessory extended cap shown in FIG. 5.

Referring also to FIGS. 6, 7 and 8, intersecting the annular flange 72 at shoulder junction 53 is a substantially cylindrical column 52 having a constant diameter 96 that is less than diameter 93. An axial bore 57 having a diameter 58 passes from the distal end 62 to a shoulder junction 99 with an annular flange 71 having a height 97 of approximately 0.1875 inches. Tapered section 60 abuts shoulder junction 59, forming an angle 98 of approximately forty five degrees. Formed within the annular section 54 is tapered surface 67 which terminates at lip 68 which abuts an axial bore 64. The axial bore 64 fits over the supporting shaft 9 with a clearance of approximately 0.0025 inches.

Referring now to FIGS. 9, 10, 11 and 12, fastener 23 is shown above the cap 7 and passes freely through the axial bore 21 of cap 7 to mate with threaded axial bore 15 of the supporting shaft 9. The cap 7 fits over the shaft 9. The reel foot 6 is captured between the cap 7, supporting shaft 9, and the rear bushing 8. Fastener 23 urges the cap 7 toward bushing 8, bearing upon and thereby abutting the reel foot 6 and urging the reel foot 6 into a secure relationship with the tapered portion 12 of the rear bushing 8. The accessory extended cap 50 may be used interchangeably as a replacement for the cap 7. When using cap 50, fastener 23 passes freely through axial bore 57 and mates with the threaded axial bore 15 of the supporting shaft 9.

FIGS. 13 and 14 show another reel seat 105, according to some embodiments. As shown, various features of the reel seat 105 are similar to the reel seat 5. The reel seat 105 includes a cap 107, a rear bushing including a receiver portion 108A and a limiter portion 108B, and a shaft 109. In general terms, the shaft 109 is optionally substantially similar to the shaft 9.

FIGS. 15-17 show the cap 107, according to some embodiments. As shown, the cap 107 is substantially similar to the cap 7, where the cap 107 defines an internal tapered surface 124. The cap 107 optionally further includes one or more recesses 124A formed into the tapered surface 124, each of the recesses 124A defines an arcuately-shaped, relatively deeper pocket configured to receive a reel foot of a reel. In some embodiments, each of the recesses, also described as pockets, is substantially the same size. In other embodiments, the recesses are formed to have different sizes (e.g., to accommodate differently sized reel feet). Although two are shown, a different number (e.g., four) are contemplated.

FIGS. 18-20 show the receiver portion 108A of the rear bushing, according to some embodiments. As shown, the receiver portion 108A includes similar features to the rear bushing 8, where the receiver portion 108A has an internal bore 127A that forms an internal tapered surface 112. The receiver portion 108A optionally further includes one or more recesses 112A formed into the tapered surface 112. Similarly to the recesses 124A, the recesses 112 are adapted to receive a reel foot of a reel. In some embodiments, the recesses 112A are matched to the recesses 124A, where the recesses 112A, 124A define complementary pairs for receiving a reel foot of a reel.

The limiter portion 108B of the rear bushing is optionally substantially annular in shape and has an increased outer diameter relative to the shaft (e.g., substantially the same diameter as the receiver portion 108A) to define a stop surface 108S, has an internal bore 127B, and is adapted to be fixed to the shaft 109 of the reel seat 105 at a desired longitudinal position along the shaft 109. In some embodiments, a fastener 110 (such as a pin or screw) is utilized to secure the limiter portion 108B relative to the shaft 109. In other embodiments, the limiter portion 108B alternatively or additionally includes internal female threading (not shown) on the internal bore 127B and the shaft 109 includes complementary male threading for securing the limiter portion 108B on the shaft 109 at a desired longitudinal position. In other embodiments, the limiter portion 108B is formed with the shaft 109 (e.g., formed as a monolithic structure with the shaft machined from the same work piece).

As understood with reference to FIGS. 13 and 14, the reel seat 105 is optionally assembled by securing the limiter portion 108B on the shaft 109 at a desired longitudinal position and then slidably receiving the receiver portion 108B over the shaft 109 such that the limiter portion 108B acts as a stop, or limiter from the receiver portion 108B sliding further down the shaft 109. In other words, the receiver portion 108B is abutted against the limiter portion 108A in operation. As received over the shaft 109, the receiver portion 108B is free to rotate as desired about the shaft 109, according to some embodiments. In some other embodiments, the limiter portion 108B and the receiver portion 108B are adapted to be releasably secured relative to one another, longitudinally and/ or rotationally (e.g., using magnetic attraction, adhesives, complementary mating features on juxtaposed faces of the two components, or using other fastening means as desired). In some embodiments, the reel seat 105 is provided as a kit of parts with a plurality of receiver portions 108B having of lengths to accommodate reel feet of different lengths.

In use, a reel foot is optionally placed against the shaft 109 and received in one of the recesses 112A of the receiver portion 108A. The cap 107 is received over the shaft 109 and an opposing portion of the reel foot is received in one of the recesses 124A of the cap 107. The cap 107 is then secured to the shaft 109 using a fastener 123 and the reel foot is adjusted to a desired rotational position as desired prior to final tightening of the fastener 123 to impede further rotational movement of the reel foot about the shaft 109.

Various modifications and additions can be made to the exemplary embodiments discussed without departing from the scope of the present invention. For example, as shown in FIGS. 21-24 alternative cap 207 and receiver portion 208 designs include hexagonal outer profiles or any of a variety of shapes. While the embodiments described above refer to particular features, the scope of this invention also includes embodiments having different combinations of features and embodiments that do not include all of the above described features.

The following is claimed:

1. A reel seat for attaching a reel foot of a reel to a bow, the reel seat comprising:
   a shaft having a first end and a second end, an outer surface, a first bore formed into the first end of the shaft and a second bore formed into the second end of the shaft;
   a rear bushing including a limiter portion and a receiver portion, the limiter portion being secured to the shaft such that the limiter portion is prevented from rotating about the shaft and from moving longitudinally along the shaft, the limiter portion defining an increased diameter relative to the shaft to form a stop surface the receiver portion having a bore and being coaxially received over the shaft such that the receiver portion is abutted against the stop surface and rotatable about the shaft, the receiver portion defining an internal surface configured to receive a first end of a reel foot between the receiver portion and the shaft;
   a cap defining a first end with an aperture and a second end, the cap having a bore extending from the second end toward the first end and defining an internal surface configured to receive a second end of a reel foot between the shaft and the cap;
   a first threaded fastener securing the cap to the shaft, the fastener extending through the aperture in the first end of the cap and into the first bore formed in the first end of the shaft to secure the cap to the shaft; and
   a second threaded fastener, the second threaded fastener secured in the second bore formed in the second end of the shaft and extending from the shaft for securing the reel seat to a bow.

2. The reel seat of claim 1, wherein the limiter portion is received over the shaft and secured to the shaft using a fastener.

3. The reel seat of claim 1, wherein the internal surface of the receiver portion defines a pocket configured to receive a first end of a reel foot.

4. The reel seat of claim 1, wherein the internal surface of the cap defines a pocket configured to receive a second end of a reel foot.

5. The reel seat of claim 1, wherein the internal surfaces of the receiver portion and the cap define respective, complementary pockets for receiving opposing ends of a reel foot.

6. The reel seat of claim 1, wherein the limiter portion and the receiver portion have substantially the same outer diameter.

7. The reel seat of claim 1, wherein the cap, the limiter portion, and the receiver portion have substantially the same outer diameter.

8. The reel seat of claim 1, wherein the limiter portion is secured against relative rotation about the shaft and the receiver portion is free to rotate about the shaft prior to securing a reel foot to the reel seat.

9. The reel seat of claim 1, wherein the internal surfaces of the cap and the receiver portion are each tapered.

10. A method of making a reel seat for a bow, the method comprising:
   providing a shaft having a first end and a second end, an outer surface, a first bore formed into the first end of the shaft and a second bore formed into the second end of the shaft;
   providing a limiter portion on the shaft, the limiter portion defining an increased diameter relative to the shaft to form a stop surface such that the limiter portion is prevented from rotating about the shaft and from moving longitudinally along the shaft;
   sliding a receiver portion over the shaft such that the receiver portion is abutted against the stop surface and rotatable about the shaft, the receiver portion defining an internal surface configured to receive a first end of a reel foot between the receiver portion and the shaft;
   sliding a cap over the first end of the shaft, the cap having a bore extending from the second end toward the first end and defining an internal surface configured to receive a second end of a reel foot between the shaft and the cap;
   securing a first threaded fastener through an aperture in a first end of the cap into the first bore formed in the first end of the shaft to secure the cap to the shaft; and
   securing a second threaded fastener in the second end of the shaft such that the second threaded fastener extends from the shaft for securing the reel seat to a bow.

11. The method of claim 1, further comprising forming the limiter portion as a part of the shaft.

12. The method of claim 1, further comprising slidably receiving the limiter portion over the shaft and securing the limiter portion to the shaft using a fastener.

13. The method of claim 1, wherein sliding the receiver portion over shaft includes defining a pocket configured to receive a first end of a reel foot.

14. The method of claim 1, wherein sliding the cap over the shaft includes defining a pocket configured to receive a second end of a reel foot.

15. The method of claim 1, further comprising tightening the first threaded fastener against the cap until the cap is substantially prevented from rotating about the shaft.

16. The method of claim 1, wherein upon receipt of the cap and the receiver portion on the shaft, the cap, the limiter portion, and the receiver portion are coaxially aligned and have substantially the same outer diameter.

17. The reel seat of claim 1, further comprising securing the limiter portion against relative rotation about the shaft and further wherein the receiver portion is free to rotate about the shaft.

\* \* \* \* \*